(12) United States Patent
Zeng et al.

(10) Patent No.: US 10,960,319 B2
(45) Date of Patent: Mar. 30, 2021

(54) BUILDING ELEMENT FOR MODULAR DEVICE, HOT-SWAP DETECTION CIRCUIT AND ORIENTATION DETECTION CIRCUIT

(71) Applicant: UBTECH ROBOTICS CORP LTD, Shenzhen (CN)

(72) Inventors: Yongping Zeng, Shenzhen (CN); Wei He, Shenzhen (CN); Wenhua Fan, Shenzhen (CN); Zhongliang Wang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/727,969

(22) Filed: Dec. 27, 2019

(65) Prior Publication Data
US 2020/0206646 A1 Jul. 2, 2020

(30) Foreign Application Priority Data
Dec. 28, 2018 (CN) .......................... 201811618022.9

(51) Int. Cl.
| | |
|---|---|
| *H01R 11/30* | (2006.01) |
| *A63H 33/04* | (2006.01) |
| *G06F 13/40* | (2006.01) |
| *H01R 13/62* | (2006.01) |
| *G06F 1/26* | (2006.01) |

(52) U.S. Cl.
CPC ....... *A63H 33/042* (2013.01); *G06F 13/4081* (2013.01); *H01R 13/6205* (2013.01); *A63H 33/046* (2013.01); *G06F 1/26* (2013.01)

(58) Field of Classification Search
CPC .... A63H 33/042; A63H 33/046; A63H 33/08; G06F 13/4081; G06F 1/26; G06F 1/266; H01R 13/6205
USPC ...................................................... 439/38, 39
See application file for complete search history.

(56) References Cited

U.S. PATENT DOCUMENTS

| | | | | |
|---|---|---|---|---|
| 7,238,026 B2 * | 7/2007 | Brown | ...................... | G09B 1/36 434/258 |
| 7,322,873 B2 * | 1/2008 | Rosen | .................. | A63H 33/042 446/124 |
| 7,507,136 B2 * | 3/2009 | Patton | .................. | A63H 33/046 335/285 |

(Continued)

*Primary Examiner* — Abdullah A Riyami
*Assistant Examiner* — Nelson R. Burgos-Guntin

(57) ABSTRACT

A building element for a modular device includes a male connector comprising M first magnets, a first ground terminal, a first detection terminal, a first power terminal, and a first signal terminal; and a female connector comprising M second magnets that are magnetically attractable to the first magnets, N second ground terminals, O second detection terminals, P second power terminals, and a second signal terminal. When the male connector of one building element is mechanically connected to the female connector of another building element, the first ground terminal, the first detection terminal, the first power terminal and the first signal terminal of the male connector of the one of two building elements respectively come into contact with one of the second ground terminals, one of the second detection terminals, one of the second power terminals, and the second signal terminal of the other one of the two building elements.

15 Claims, 6 Drawing Sheets

(56) References Cited

U.S. PATENT DOCUMENTS

| | | | | |
|---|---|---|---|---|
| 7,556,563 | B2* | 7/2009 | Ellis | A63F 13/10 |
| | | | | 463/31 |
| D732,475 | S * | 6/2015 | Bdeir | D13/146 |
| 9,527,394 | B1* | 12/2016 | Tang | B60W 10/26 |
| 9,597,607 | B2* | 3/2017 | Bdeir | A63H 33/26 |
| 10,758,836 | B2* | 9/2020 | Akishbekov | A63H 33/086 |
| 2010/0035441 | A1* | 2/2010 | Rohrbach | H01R 13/24 |
| | | | | 439/39 |
| 2010/0087119 | A1* | 4/2010 | Vicentelli | A63H 33/046 |
| | | | | 446/92 |
| 2010/0214747 | A1* | 8/2010 | Jacobs | H05K 3/303 |
| | | | | 361/729 |
| 2011/0031689 | A1* | 2/2011 | Binder | A63F 9/1011 |
| | | | | 273/157 R |
| 2011/0151743 | A1* | 6/2011 | Munch | A63H 33/086 |
| | | | | 446/91 |
| 2011/0300772 | A1* | 12/2011 | Risvig | A63H 33/086 |
| | | | | 446/91 |
| 2012/0122059 | A1* | 5/2012 | Schweikardt | G09B 23/00 |
| | | | | 434/118 |
| 2012/0178270 | A1* | 7/2012 | McElroy | H01R 13/6205 |
| | | | | 439/39 |
| 2012/0223479 | A1* | 9/2012 | Pabon | A63F 3/02 |
| | | | | 273/236 |
| 2012/0262301 | A1* | 10/2012 | Davidson | G08B 21/24 |
| | | | | 340/657 |
| 2013/0050958 | A1* | 2/2013 | Bdeir | H01R 13/6205 |
| | | | | 361/730 |
| 2014/0065847 | A1* | 3/2014 | Salmon | G07C 9/00182 |
| | | | | 439/39 |
| 2020/0206646 | A1* | 7/2020 | Zeng | G06F 13/4081 |

* cited by examiner

BUILDING ELEMENT FOR MODULAR DEVICE, HOT-SWAP DETECTION CIRCUIT AND ORIENTATION DETECTION CIRCUIT

CROSS REFERENCE TO RELATED APPLICATIONS

This application claims priority to Chinese Patent Application No. 201811618022.9, filed Dec. 28, 2018, which is hereby incorporated by reference herein as if set forth in its entirety.

BACKGROUND

1. Technical Field

The present disclosure generally relates to modular devices, and particularly to a module device in which the attachment and removal of building elements can be detected.

2. Description of Related Art

Modular devices such as modular robots, and toy building blocks are well known. A module device typically includes a number of building elements that can be connected to one another. For some electric modular devices, it is useful and desirable to provide a module device in which the attachment and removal of building elements can be detected.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding arts throughout the several views.

DETAILED DESCRIPTION

Figure 1:
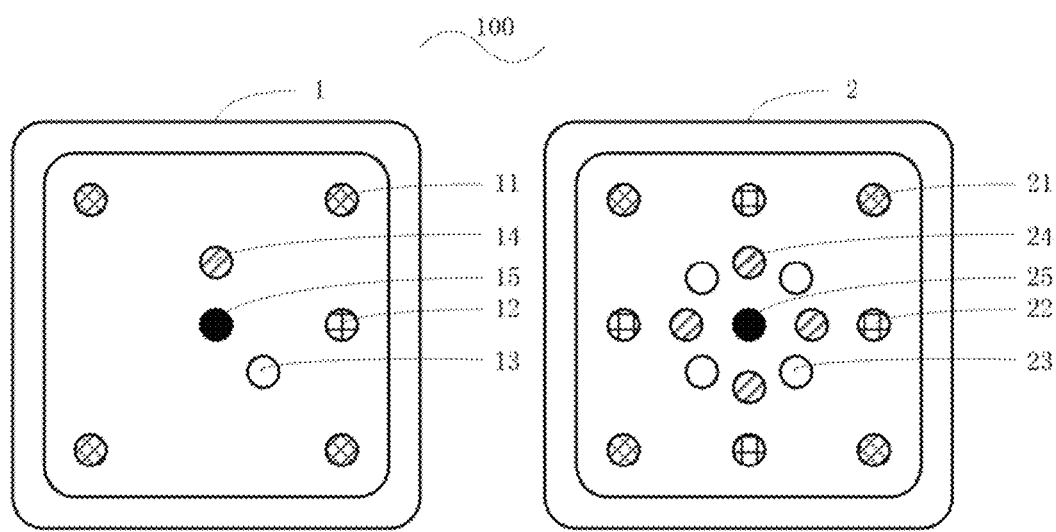
FIG. 1 is a schematic diagram of the mating surfaces of a male connector and a female connector of a building element according to an embodiment.

The disclosure is illustrated by way of example and not by way of limitation the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", in the orientational or positional relationship based on the orientational or positional relationship shown in the drawings, are merely for convenience of description, but are not intended to indicate or imply that the device or dements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Referring to FIG. 1, in one embodiment, a building element 100 for a modular device including a number of such building elements is includes a male connector 1 and a female connector 2. The building element 100 is a servo for a modular robot and provides rotational motion. In an alternative embodiment, the building element 100 may be a toy building block.

The male connector 1 includes M first magnets 11, a first around terminal 12, a first detection terminal 13, a first power terminal 14, and a first signal terminal 15. The female connector 2 includes M second magnets 21 that are magnetically attractable to the first magnets 11, N second ground terminals 22, O second detection terminals 23, P second power terminals 24, and a second signal terminal 25, where M, N, O, and P are natural numbers and at least one of them is greater than 1.

Figure 2:
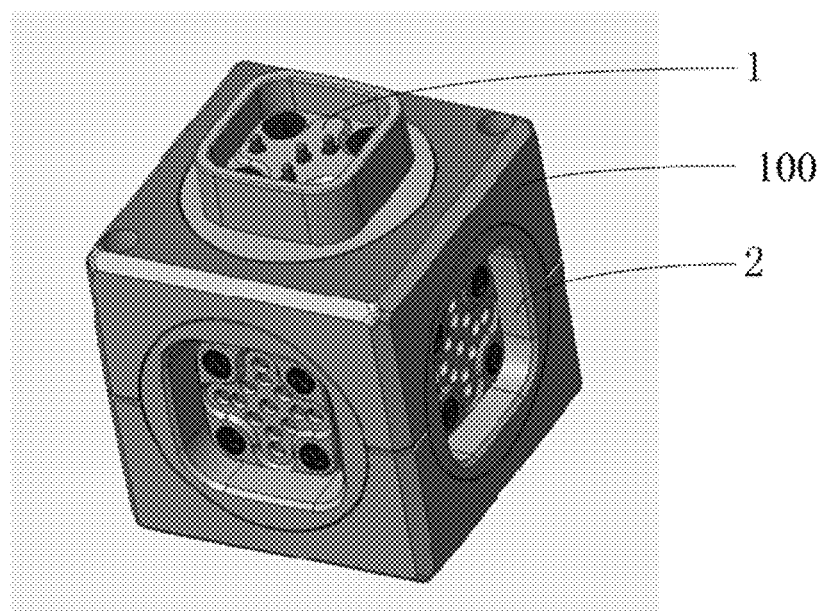
FIG. 2 is a schematic isometric view of the building element according to a first embodiment.

Referring to FIG. 2, in one embodiment the building element 100 is cubic and includes one male connector 1 and five female connectors 2, three of which are not shown. The male connector 1 and the female connectors 2 are respectively arranged at six side surfaces of the cubic main both of the building element 100.

Figure 3:
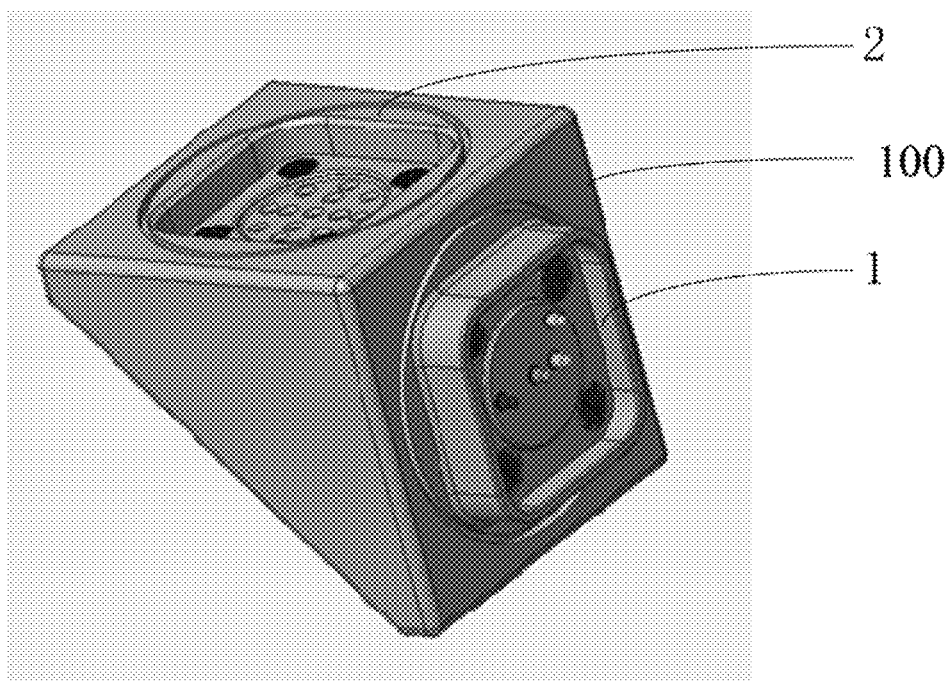
FIG. 3 is a schematic isometric view of the building element according to a second embodiment.

Referring to FIG. 3, in one embodiment, the building element 100 may be of a triangular prism and may include one male connector 1 and three female connectors 2, two of which are not shown. The male connector 1 and the female connectors 2 are respectively arranged at different side surfaces of the main body of the building element 100.

When the male connector 1 of one of two building elements 100 is mechanically connected to the female connector 2 of the other building element 100 by the first magnets 11 and the second magnets 21 thereof, the first ground terminal 12, the first detection magnet 13, the first power terminal 14 and the first signal terminal 15 of the male connector 1 of the building element 100 respectively come into contact with one of the second round terminals 22, one of the second detection terminals 23, one of the second power terminals 24, and the second signal terminal 25 of the other building element 100, which electrically connects the two building elements 100 together.

It should be noted that M, N, O and P can be adjusted according to actual needs, on the condition that one of them is greater than 1. The positions of the magnets and terminals in the male and female connectors can also be changed according to actual needs.

As shown in FIG. 1, in the embodiment, M, N, O and P are all equal to four. The male connector 1 and the female connector 2 are both square. The four first magnets 11 are evenly arranged at the four corners of the male connector 1. The first ground terminal 12 is arranged between two adjacent ones of the four first magnets 11. The signal terminal 15 is arranged between two of the four first magnets 11 that are located on a diagonal of an imaginary rectangle formed by the tour first magnets 11. The first detection terminal 13 is arranged between the signal terminal 15 and one of the first magnets 11. The power terminal 14 is arranged within a triangular area defined by the two of the first magnets 11 and the signal terminal 15. The signal terminal 15 is located at a center of a square defined by the four first magnets 11.

The four second magnets 21 are evenly arranged at the four corners of the male connector. Each of the four ground terminals 22 is arranged between two adjacent ones of the second magnets 21. The signal terminal 25 is arranged between two of the four second magnets 21 that are located on a diagonal of an imaginary rectangle formed by the four second magnets 21. Each of the four second detection terminals 23 is arranged between the signal terminal 25 and one of the second magnets 21. Each of the four power terminals 24 is arranged within one triangular area defined by the second signal terminal 25 and two adjacent ones of the four second magnets 21. Rectangles defined b the four second magnets 21, the four second ground terminals 22, the four second detection terminals 23 and the four power terminals 24 share a same center and the signal terminal 25 is located at the center of the four rectangles.

In FIG. 1, in order to easily distinguish different parts, the same color or patterns represent the same type of parts, and different fill colors or patterns represent different types of parts. The shape and size of the magnets and terminals can be adjusted according to actual needs. In FIG. 1, for convenience of illustration, the shapes of the magnets and the terminals are exemplarily set to be circular, and in other embodiments, they can also be set to regular or irregular shapes such as regular polygons and ovals.

With such configuration, the male connector and the female connector can be detachably and electrically connected to each other.

Figure 4:
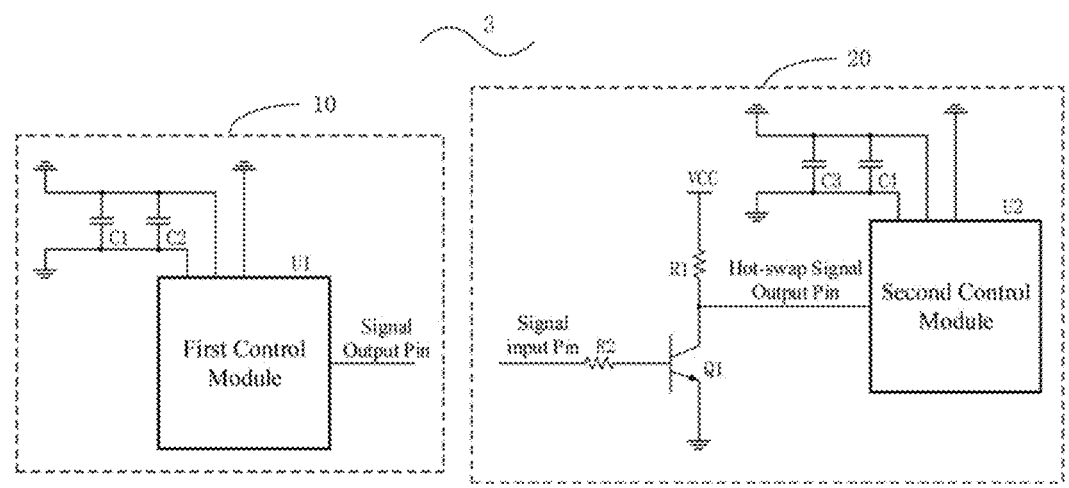
FIG. 4 is a schematic diagram of a hot-swap detection circuit according to an embodiment.

Referring, to FIG. 4, in one embodiment, a hot-swap detection circuit 3 includes a first hot-swap detection circuit 10 arranged in the male connector 1 and a second hot-swap detection circuit 20 arranged in the female connector 20.

The first hot-swap detection circuit 10 includes a first control module U1 that includes a first power pin electrically connected to a power supply VCC, a signal output pin electrically connected to the first detection terminal 13 of the male connector 1, and a first ground pin that is grounded.

The second hot-swap detection circuit 20 includes a second control module U2 and an electronic switch module Q1. The second control module U2 includes a second power pin electrically connected to the power supply VCC, a detection pin electrically connected to a hot-swap signal output pin of the electronic switch module Q1, and a second ground pin that is grounded. The electronic switch module Q1 includes a third power pin electrically connected to the power supply VCC, a signal input pin connected to one of the second detection terminals 23 of the female connector 2, and a third ground pin that is grounded.

When the electrical signal output by the male connector 1 is regularly read by the female connector 2, the female connector 2 determines that the male connector 1 and the female connector 2 are electrically connected to each other. When the female head 2 does not read the electrical signal from the male connector 1, the female connector 2 determines that the male connector 1 and the female connector 2 are not electrically connected to each other.

In the embodiment, the male connector outputs an electric signal through the first control module. When the male connector and the female connector are mechanically connected to each other, the detection terminals of the male connector 1 and the female connector come into contact, and the signal input pin of the electronic switch module Q1 of the female connector 2 inputs the electric signal through the detection terminal of the female connector 2, and the electronic switch module Q1 is turned on. When the detection pin of the second control module U2 of the female connector receives the signal from the hot-swap signal output pin of the electronic switch module Q1 regularly, it is determined that the male and female connector are electrically connected to each other. When the male and female connectors are not mechanically connected to each other, the second control module U2 of the female connector cannot regularly read the electrical signals from the first control module U1 of the male connector.

Each of the first control module and the second control module can be any processors having data processing and control functions. The processor may he a central processing unit (CPU), a general purpose processor, a digital signal processor (DSP), an application specific integrated circuit (ASIC), a field-programmable gate array (FPGA), a programmable logic device a discrete gate, a transistor logic device, or a discrete hardware component. The general purpose processor may be a microprocessor or any conventional processor or the like.

In one embodiment, the electronic switch module can be any device having an electronic switching function according to actual, needs, such as a field effect transistor, a bipolar junction transistor, and the like.

FIG. 4 exemplarily shows that the electronic switch module is a field effect transistor. The base, the input terminal, and the output terminal of the field effect transistor respectively serve as the signal input pin, the power pin, and a hot-swap signal output pin of the electronic switch module.

As shown in FIG. 4, in one embodiment, the first hot-swap detection circuit 10 further includes a first voltage-dividing resistor R1 and a second voltage-dividing resistor R2. The first voltage-dividing resistor R1 is electrically connected between the power supply VCC and the third power pin of the electronic switch module Q1. The second voltage-dividing resistor R2 is electrically connected between the signal input pin of the electronic switch module Q1 and the one of the second detection terminals of the female connector 2.

In one embodiment, the types and resistance values of the first voltage dividing resistor and the second voltage dividing resistor can be selected according to actual needs.

As shown in FIG. 4, in one embodiment, the first hot-swap detection circuit 10 further includes at least one first bypass capacitor that is connected in parallel between the first power pin and the first ground pin of the first control module U1.

In one embodiment, the number and capacitance values of the first bypass capacitor can be selected according to actual needs. FIG. 4 exemplarily shows that the first detection circuit 10 includes two first bypass capacitors, which are denoted as C1 and C2, respectively.

As shown in FIG. 4, in one embodiment, the second hot-swap detection circuit 20 further includes at least one second bypass capacitor that is connected in parallel between the second power pin and the second ground pin of the second control module U2.

In one embodiment, the number and capacitance values of the second bypass capacitor can be selected according to actual needs. FIG. 4 exemplarily shows that the second hot-swap detection circuit 20 includes two second bypass capacitors, which are denoted as C3 and C4, respectively.

With such configuration, when the signal from the male connector is regularly read by the female connector, the female connector determines that the male connector and the female connector are electrically connected to each other. When the female connector cannot regularly read the signal from the male connector, the female connector determines that the male connector and the female connector are not electrically connected to each other. The detection of the electrical connection and disconnection of the male connector and the female connector is thus achieved.

Figure 5:
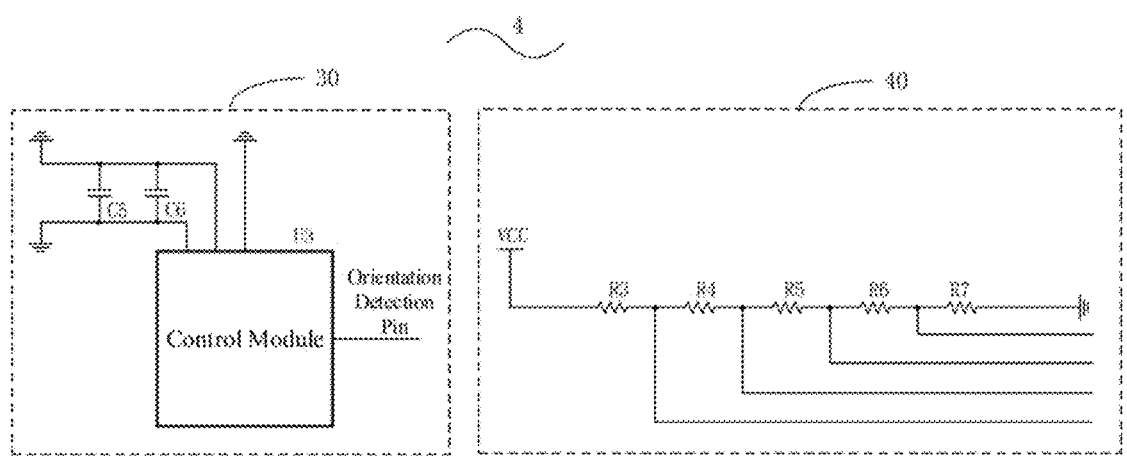
FIG. 5 is a schematic diagram of an orientation detection circuit according to an embodiment.

Referring to FIG. 5, in one embodiment, an orientation detection circuit 4 includes a first orientation detection circuit 30 arranged in the male connector 1, and a second orientation detection circuit 40 arranged in the female connector 2.

The first orientation detection circuit 30 includes a control module U3 that includes a power pin electrically connected to the power supply VCC, an orientation detection pin electrically connected to the first detection terminal of the male connector 1, and a ground pin that is grounded.

The second orientation detection circuit 40 includes Q voltage dividing resistors connected successively. A first resistor R3 of the voltage dividing resistors is connected to the power supply, and a last resistor R7 of the voltage dividing resistors is grounded. The O second detection terminals of the female connector 2 are respectively connected between O pairs of adjacent ones of the voltage dividing resistors at O nodes, where Q is a natural number greater than O. The male connector 1 reads voltage value of the orientation detection pin of the control module U3, and determines an orientation of the second detection terminal of the female connector 2 that contacts the first detection terminal of the male connector 1 according to the voltage values.

In the embodiment, each of the nodes can be between any two adjacent voltage dividing resistors. The number Q can be adjusted according to actual needs, on the condition that Q is greater than O such that there are O nodes between O pairs of adjacent voltage dividing resistors. With such arrangement, one of the second detection terminals of the female connector 2 comes into contact with the first detection terminal of the male connector 1 when the two connectors are connected to each other, and the voltage value of the orientation detection pin of the control module of the male connector can be detected. Since the second detection terminals of the female connector 2 are respectively connected between O pairs of adjacent voltage dividing resistors at O nodes, the voltage values of the second detection terminals are all different. Thus, the control module can determine which second detection terminal of the female connector contacts the first detection terminal of the male connector according to the voltage value of the orientation detection pin of the control module. The orientation of the female connector 2 can thus be determined.

The control module of the orientation detection circuit can be any processors having data processing and control functions. The processor may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

In one embodiment, O equals to three and Q equals to five. As shown in FIG. 5, The second orientation detection circuit 40 includes five voltage dividing resistors connected in series, which are respectively denoted as R3, R4, R5, R6, and R7. There is one node between R3 and R4, between R4 and R5, between R5 and R6, and between R6 and R7, and the four detection terminals of female connector 2 are respectively connected to the four nodes. It should be noted that the resistance values of the resistors above can be selected according to actual needs.

As shown in FIG. 5, in one embodiment, the first detection circuit 30 further includes a bypass capacitor connected in parallel between the power pin and the ground pin of the control module U3. The number and capacitance values of the first bypass capacitor can be selected according to actual needs. FIG. 5 exemplarily shows that the first orientation detection circuit 30 includes two bypass capacitors, which are denoted as C5 and C6, respectively.

With such configuration, when the male and female connectors are connected to each other, the male connector can read voltage value of its orientation detection pin, and determine an orientation of the female connector according to the voltage value.

The building element, the hot-swap detection circuit and the orientation detection circuit of the above embodiments can be applied in many types of robots, such as modular robots. For example, the building element may be a servo assembly that provides rotation motion. When the servo is attached to the robot, other type of building elements, such as legs and arms, can be attached to the servo and rotate as driven by the servo.

Figure 6:
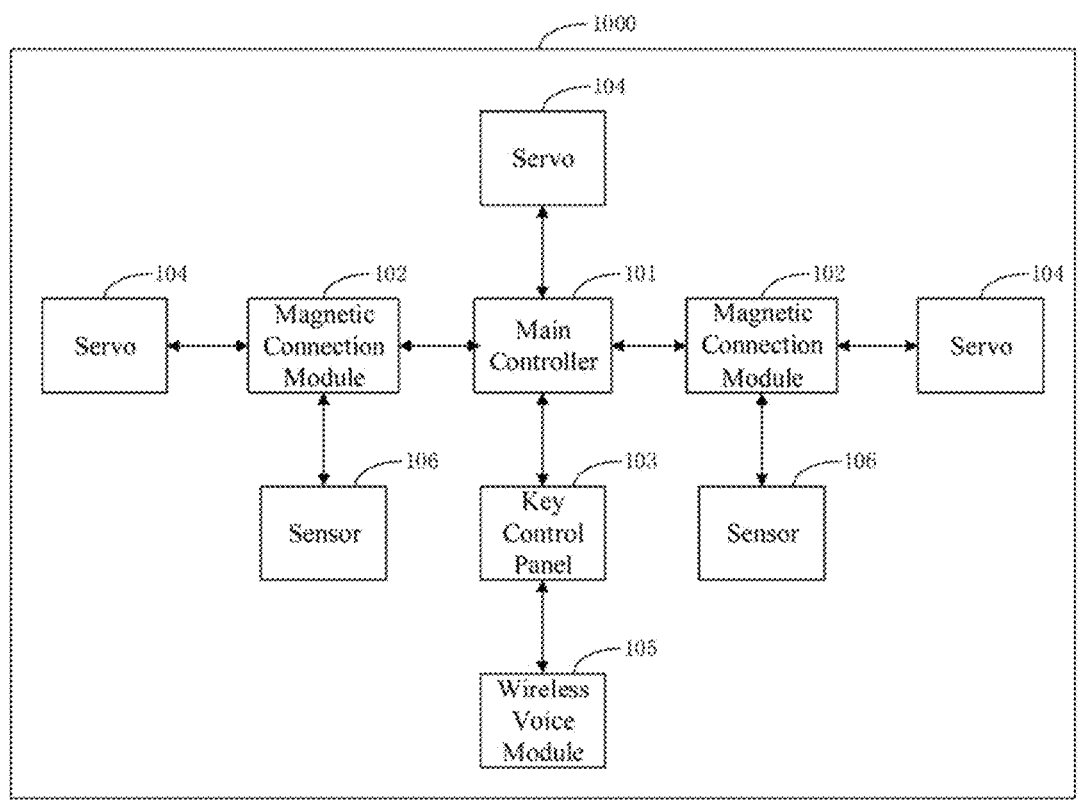
FIG. 6 is a schematic block diagram of a modular device according to an embodiment.

FIG. 6 is a schematic block diagram of a modular device according to an embodiment. In one embodiment, a modular device 1000 may include two magnetic connection modules 102, a key control panel 103, three servos 104, a wireless voice module 105, and two sensors 106. Each magnetic connection module 102 includes two or more building elements 100. One of the three servos 104 is directly connected to the main controller 101 through connectors, and the other two servos 104 are indirectly connected to the main controller 101 through the building elements 100 of the magnetic connection module 102. The wireless voice module 105 is indirectly connected to the main controller 101 through the key control panel 103. Both sensors 106 are indirectly connected to the main controller 101 through the building elements 100 of the magnetic connection module 102.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A building element for a modular device comprising a plurality of such building elements, the building element comprising:

a male connector comprising M first magnets, a first ground terminal, a first detection terminal, a first power terminal, and a first signal terminal; and a female connector comprising M second magnets that are magnetically attractable to the first magnets, N second ground terminals, O second detection terminals, P second power terminals, and a second signal terminal, where M, N, O, and P are natural numbers and N, O, and P are equal to one another and are all greater than 1;

wherein when the male connector of one of two building elements is mechanically connected to the female connector of the other one of the two building elements by the first magnets and the second magnets thereof, the first ground terminal, the first detection terminal, the first power terminal and the first signal terminal of the male connector of the one of two building elements respectively come into contact with one of the second ground terminals, one of the second detection terminals, one of the second power terminals, and the second signal terminal of the other one of the two building elements, which electrically connects the two building elements together.

2. The building element according to claim 1, wherein M, N, O and P are all equal to four, the four first magnets are evenly arranged adjacent to four corners of the male connector, the first ground terminal is arranged between two adjacent ones of the four first magnets, the signal terminal is arranged between two of the four first magnets that are located on a diagonal of an imaginary rectangle formed by the four first magnets, the detection terminal is arranged between the signal terminal and one of the first magnets, the power terminal is arranged within a first triangular area defined by the two of the first magnets an the signal terminal, and the signal terminal is located at a center of a square defined by the four first magnets;

the four second magnets are evenly arranged adjacent to four corners of the male connector, each of the four ground terminals is arranged between two adjacent ones of the second magnets, the signal terminal is arranged between two of the four second magnets that are located on a diagonal of an imaginary rectangle formed by the four second magnets, each of the four second detection terminals is arranged between the signal terminal and one of the second magnets, each of the four power terminals is arranged within one second triangular area defined by the second signal terminal and two adjacent ones of the four second magnets, rectangles defined by the four second magnets, the four second ground terminals, the four second detection terminals and the four power terminals share a same center and the signal terminal is located at the center of the four rectangles.

3. The building element according to claim 1 being cubic, wherein the male connector and the female connector are arranged at side surfaces of the building element.

4. The building element according to claim 1 being of a triangular prism, wherein the male connector and the female connector are arranged at side surfaces of the building element.

5. The building element according to claim 1 further comprising a hot-swap detection circuit, wherein the hot-swap detection circuit comprises:

a first detection circuit arranged in the male connector, the first detection circuit comprising a first control module that comprises a first power pin electrically connected to a power supply, a signal output pin electrically connected to the first detection terminal of the male connector, and a first ground pin that is grounded; and a second detection circuit arranged in the female connector, the second detection circuit comprising a second control module and an electronic switch module, the second control module comprising a second power pin electrically connected to the power supply, a detection pin electrically connected to a hot-swap signal output pin of the electronic switch module, and a second ground pin that is grounded; the electronic switch module comprising a third power pin electrically connected to the power supply, a signal input pin connected to one of the second detection terminals of the female connector, and a third ground pin that is grounded.

6. The building element according to claim 5, wherein the second detection circuit further comprises a first voltage-dividing resistor and a second voltage-dividing resistor, the first voltage-dividing resistor is electrically connected between the power supply and the third power pin of the electronic switch module, and the second voltage-dividing resistor is electrically connected between the signal input pin and the one of the second detection terminals of the female connector.

7. The building element according to claim 5, wherein the first detection circuit further comprises at least one first bypass capacitor that is connected in parallel between the first power pin and the first ground pin.

8. The building element according to claim 5, wherein the second detection circuit further comprises at least one second bypass capacitor that is connected in parallel between the second power pin and the second ground pin.

9. A building element for a modular device comprising a plurality of such building elements, the building element comprising:

a male connector comprising M first magnets, a first ground terminal, a first detection terminal, a first power terminal, and a first signal terminal; and a female connector comprising M second magnets that are magnetically attractable to the first magnets, N second ground terminals, O second detection terminals, P second power terminals, and a second signal terminal, where M, N, O, and P are natural numbers and at least one of them is greater than 1; wherein when the male connector of one of two building elements is mechanically connected to the female connector of the other one of the two building elements by the first magnets and the second magnets thereof, the first ground terminal, the first detection terminal, the first power terminal and the first signal terminal of the male connector of the one of two building elements respectively come into contact with one of the second ground terminals, one of the second detection terminals, one of the second power terminals, and the second signal terminal of the other one of the two building elements, which electrically connects the two building elements together; and an orientation detection circuit comprising:

a first detection circuit arranged in the male connector, the first detection circuit comprising a control module that comprises a power pin electrically connected to a power supply, an orientation detection pin electrically connected to the first detection terminal of the male connector, and a ground pin that is grounded; and a second detection circuit arranged in the female connector, the second detection circuit comprises Q voltage dividing resistors connected successively, a first one of the voltage dividing resistors is connected to a power supply, a last one of the voltage dividing resistors is grounded, the O second detection terminals of the female connector are respectively connected between O pairs of adjacent ones of the voltage dividing resistors at O nodes, where Q is a natural number greater than O;

wherein the male connector reads voltage value of the orientation detection pin, and determines an orientation of the female connector according to the voltage value.

10. The building element according to claim 9, wherein Q equals to five.

11. The building element according to claim 9, wherein the first detection circuit further comprises a bypass capacitor connected in parallel between the power pin and the ground pin of the control module.

12. A modular device comprising:
a plurality of building elements that are connected to one another, each of the plurality of building elements comprising:
   a male connector comprising M first magnets, a first ground terminal, a first detection terminal, a first power terminal, and a first signal terminal; and
   a female connector comprising M second magnets that are magnetically attractable to the first magnets, N second ground terminals, O second detection terminals, P second power terminals, and a second signal terminal, where M, N, O, and P are natural numbers and N, O, and P are equal to one another and are all greater than 1;
   wherein when the male connector of one of two building elements is mechanically connected to the female connector of the other one of the two building elements by the first magnets and the second magnets thereof, the first ground terminal, the first detection terminal, the first power terminal and the first signal terminal of the male connector of the one of two building elements respectively come into contact with one of the second ground terminals, one of the second detection terminals, one of the second power terminals, and the second signal terminal of the other one of the two building elements, which electrically connects the two building elements together.

13. The modular device according to claim 12, wherein M, N, O and P are all equal to four, the four first magnets are evenly arranged adjacent to four corners of the male connector, the first ground terminal is arranged between two adjacent ones of the four first magnets, the signal terminal is arranged between two of the four first magnets that are located on a diagonal of an imaginary rectangle formed by the four first magnets, the detection terminal is arranged between the signal terminal and one of the first magnets, the power terminal is arranged within a first triangular area defined by the two of the first magnets an the signal terminal, and the signal terminal is located at a center of a square defined by the four first magnets;
   the four second magnets are evenly arranged adjacent to four corners of the male connector, each of the four ground terminals is arranged between two adjacent ones of the second magnets, the signal terminal is arranged between two of the four second magnets that are located on a diagonal of an imaginary rectangle formed by the four second magnets, each of the four second detection terminals is arranged between the signal terminal and one of the second magnets, each of the four power terminals is arranged within one second triangular area defined by the second signal terminal and two adjacent ones of the four second magnets, rectangles defined by the four second magnets, the four second ground terminals, the four second detection terminals and the four power terminals share a same center and the signal terminal is located at the center of the four rectangles.

14. The modular device according to claim 12, wherein each of the plurality of building elements is cubic, the male connector and the female connector are arranged at side surfaces of each of the plurality of building elements.

15. The modular device according to claim 12, wherein each of the plurality of building elements is of a triangular prism, the male connector and the female connector are arranged at side surfaces of each of the plurality of building elements.

* * * * *